United States Patent

Rowe et al.

[11] Patent Number: 5,645,406
[45] Date of Patent: Jul. 8, 1997

[54] TRANSMISSION ASSEMBLY WITH POSITIVE-DISPLACEMENT PUMP WITH SUCTION THROTTLE DRIVEN BY A HYDRODYNAMIC CONVERTER

[75] Inventors: Gerald Rowe, Lindau; Walter Kuhn, Friedrichshafen; Christof Zippel, Salem; Michael Reichenmiller, Waldstetten, all of Germany

[73] Assignee: ZF Friedrichschafen AG, Friedrichshafen, Germany

[21] Appl. No.: 244,534

[22] PCT Filed: Nov. 26, 1992

[86] PCT No.: PCT/EP92/02726

§ 371 Date: May 27, 1994

§ 102(e) Date: May 27, 1994

[87] PCT Pub. No.: WO93/11376

PCT Pub. Date: Jun. 10, 1993

[30] Foreign Application Priority Data

Nov. 30, 1991 [DE] Germany .................. 41 39 611.1

[51] Int. Cl.$^6$ ................................. F04B 1/04
[52] U.S. Cl. .................. 417/273; 417/490; 417/295; 475/59; 74/730.1
[58] Field of Search .................. 417/273, 490, 417/298, 295; 74/730.1; 475/59

[56] References Cited

U.S. PATENT DOCUMENTS

| | | |
|---|---|---|
| 2,021,182 | 11/1935 | Hedlund .................. 417/273 |
| 2,423,701 | 7/1947 | Hardy .................. 417/490 |
| 3,293,945 | 12/1966 | Stockton .................. 475/59 |
| 3,385,059 | 5/1968 | Leonard et al. .................. 417/273 |
| 3,724,205 | 4/1973 | Hallberg .................. 60/19 |
| 3,728,046 | 4/1973 | Clark et al. . |
| 3,790,307 | 2/1974 | Aldinger .................. 417/273 |
| 4,098,143 | 7/1978 | Kubo et al. .................. 475/59 |
| 4,181,203 | 1/1980 | Malloy . |
| 4,339,234 | 7/1982 | Williams .................. 417/490 |
| 4,597,483 | 7/1986 | Porel et al. .................. 417/273 |
| 4,681,514 | 7/1987 | Griese et al. .................. 417/273 |
| 4,924,670 | 5/1990 | Bausch et al. .................. 417/490 |
| 4,975,025 | 12/1990 | Yamamura et al. .................. 417/273 |
| 5,100,305 | 3/1992 | Zirps .................. 417/273 |
| 5,156,531 | 10/1992 | Schmid et al. .................. 417/273 |
| 5,167,493 | 12/1992 | Kobari .................. 417/273 |
| 5,295,797 | 3/1994 | Kahrs et al. .................. 417/273 |
| 5,305,718 | 4/1994 | Mueller .................. 123/90.17 |
| 5,329,890 | 7/1994 | Mueller .................. 123/90.17 |

FOREIGN PATENT DOCUMENTS

| | | | |
|---|---|---|---|
| 2242435 | 8/1972 | Germany .................. | 417/273 |
| 2404792 | 1/1974 | Germany .................. | 417/273 |
| 3517929 | 11/1986 | Germany .................. | 417/490 |
| 4034267 | 5/1991 | Germany .................. | 417/273 |
| 4211931 | 11/1992 | Germany .................. | 417/273 |
| 2041076 | 7/1980 | United Kingdom .................. | 417/273 |
| 92004216 | 3/1992 | WIPO .................. | 417/273 |
| 94025754 | 11/1994 | WIPO .................. | 417/273 |

*Primary Examiner*—Timothy Thorpe
*Assistant Examiner*—Ted Kim
*Attorney, Agent, or Firm*—Larson & Taylor

[57] ABSTRACT

A gear for motor vehicles provided with a positive-displacement pump for supplying a lubricating device and the control and activating devices of the gear. The positive-displacement pump is driven by the rotation of a drive motor and is provided with a suction throttle which adjusts the flow of lubricating oil such that a relatively constant flow is maintained over a varying range of rotational speeds of the drive motor. The invention provides the advantages that gear efficiency can be improved since high rotational speeds of the drive motor do not cause a excessive flow of lubricating oil.

4 Claims, 2 Drawing Sheets

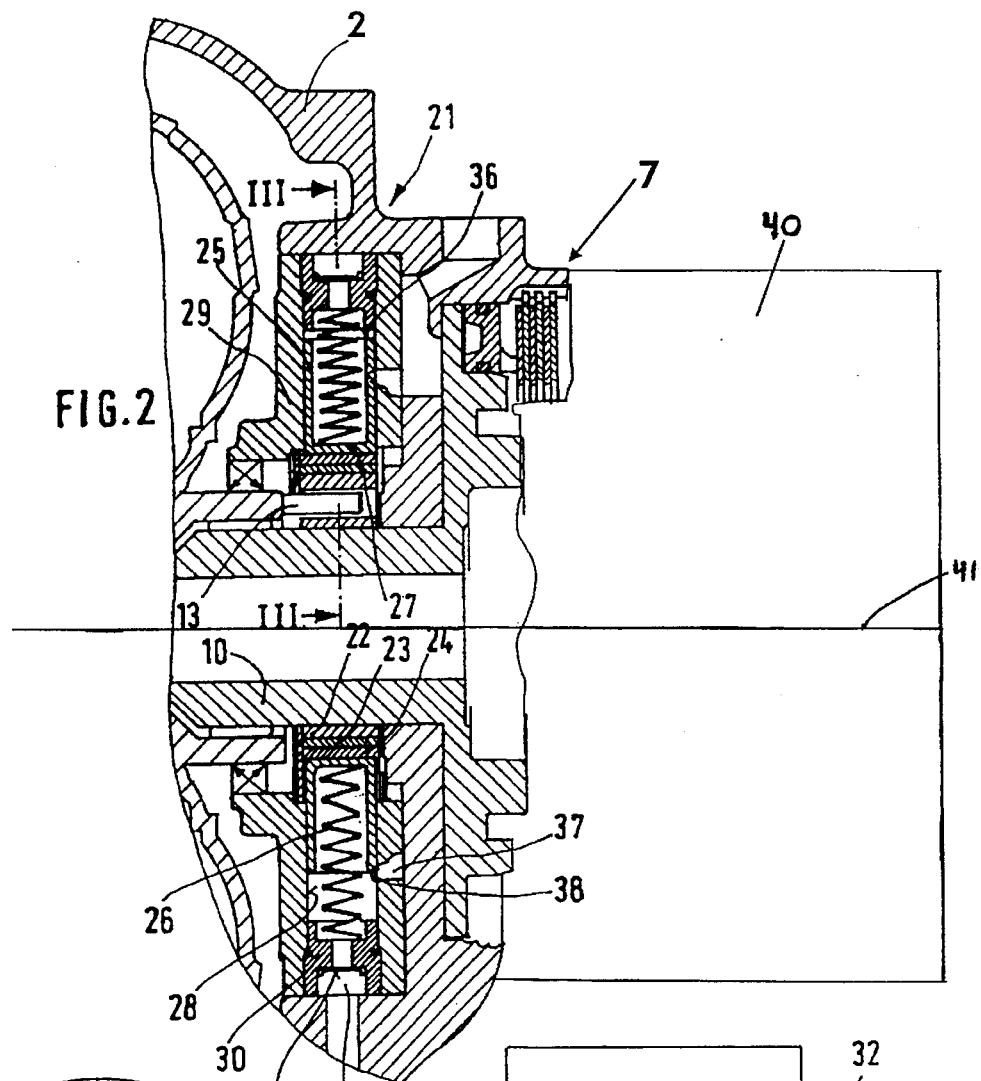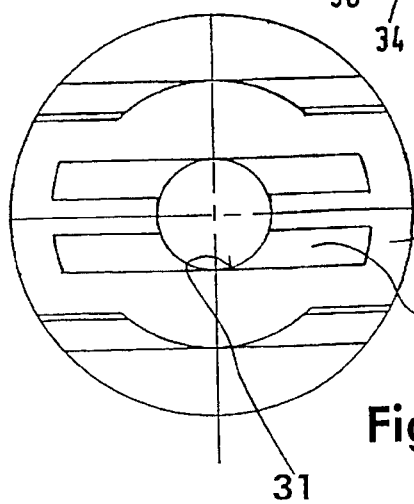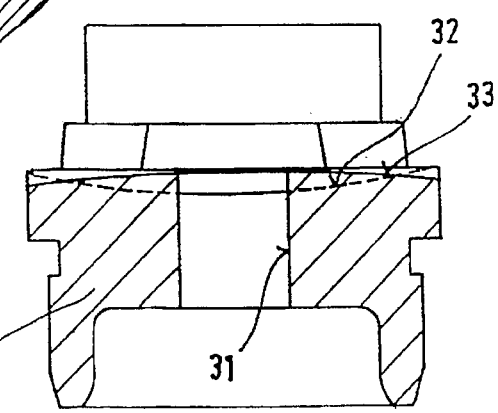

TRANSMISSION ASSEMBLY WITH POSITIVE-DISPLACEMENT PUMP WITH SUCTION THROTTLE DRIVEN BY A HYDRODYNAMIC CONVERTER

This invention relates to a transmission, especially an automatic gear or a continuously variable gear for motor vehicles with a positive-displacement pump for supplying a lubricating device and the control and activation devices of the transmission wherein the positive-displacement pump is driven by the rotation of a drive motor.

In known gears of this kind, the pumps are so-called fixed displacement pumps whose supply flow increases in proportion to the speed rotation of the drive motor. The pump is generally designed for an idling speed of the drive motor. Thus the feed flow supplied to such a pump must meet the minimum requirements of the transmission that is to be supplied when the drive motor is running at idling speed.

Such a pump conveys more than the required volume when the drive motor is running at a higher rotating speed, the conveyed volume being proportional to the speed of rotation of the drive motor. The duct cross-sections of the pump therefore must be significantly larger than would be required by the minimum supply flow needed to supply the transmission. Besides, the attendant high power consumption of the pump results in a poor transmission efficiency.

The invention is based on the concept of improving the known transmission so that the pump will consume less power and the transmission efficiency will thus be improved. To that end, the pump should have a relatively short length in the axial direction and should contain simple parts that can be made at a reasonable cost.

This problem is solved by the transmission of the present invention. The solution consists above all in the fact that the positive-displacement pump is a pump with a suction throttle.

While the power consumption of pumps without suction throttles rises in proportion to the feed volume and thus increases with the rotation speed of the drive motor, in the case of a pump with a suction throttle, once a certain rotation speed is achieved, an almost constant supply flow is conveyed by the pump and that flow results in a substantially constant power consumption by the pump.

Advantages and practical features of the invention are described below. It is thus possible, for example, to use an internally-geared wheel pump or a radial piston pump. Here, the wheel pump, which has a suction throttle, has the same advantageous features as regards to the space required for mounting as a known internal-wheel pump without a suction throttle. A radial piston pump with a suction throttle, furthermore, offers the advantage of a better volumetric efficiency. the radial piston pump is a very reliable pump because of its very minor leakage even at high pressures.

To provide a simple drive for the pump, its drive means is practically connected with a part of a start-up device that is connected in front of the transmission. In the case of a radial piston pump, its eccentric is advantageously connected with the pump wheel of an hydrodynamic converter. Because the shaft passing through the interior of the positive-displacement pump is generally fixed in the housing, the eccentric of the radial piston pump is made as an eccentric slide bush that is driven via an axially directed projection of the pump shaft of the converter.

When the pistons of the radial piston pump are made as deep-drawn parts—whose radially outwardly directed piston ring cooperates with a suction ring groove arranged in a pump housing and the groove's intake openings—a pump is obtained that "sucks in on top."

This means that the intake space is not located in the interior within reach of the eccentric. In that way, the eccentric space is not impacted by the high under pressure generated in the piston chamber. In the case of a piston pump that "sucks in from below," this eccentric space would have to be filled with oil. On account of the large shaft diameter and the resultant large sealing diameter, air could be sucked in via the seal. This disadvantage can be avoided by the arrangement of the invention because, in this case, the eccentric space contains only an oil mist used to lubricate the eccentric. The intake ring groove can be worked into the housing and requires less axial space than an arrangement of individual boreholes and a junction ring groove required for a pump that "sucks in from below". In this same manner, the means for supplying oil to the converter is thus simplified.

The cylinder boreholes of the radial piston pump are closed off in the radially outward direction by a series of plugs and its passage boreholes act as check valves for a flat spiral spring that is common to all plugs. To make sure that the feed pressure will impact the flat spiral spring better, the plugs are provided with parallel grooves that end within a worked sealing surface of the front surfaces.

The eccentric of the radial piston pump is made as an eccentric slide bush that is guided on a fixed hollow shaft. When an hydrodynamic converter is used, the eccentric slide bush is positioned in the hollow shaft of the guide wheel.

The invention is not confined to the combinations of features described. The person of a skill in the art can find additional meaningful possibilities of combining features of the invention from the problem statement.

The invention will be explained in greater detail below with the help of two practical examples illustrated in the drawings, showing:

FIG. 2 shows a second version of a transmission according to the invention with the positive-displacement pump being a radial piston pump shown in partial profile according to FIG. 1.

FIG. 3 shows a profile along line III—III in FIG. 2 on an enlarged scale.

FIG. 4 shows a top view of the device of FIG. 3.

Figure 1:
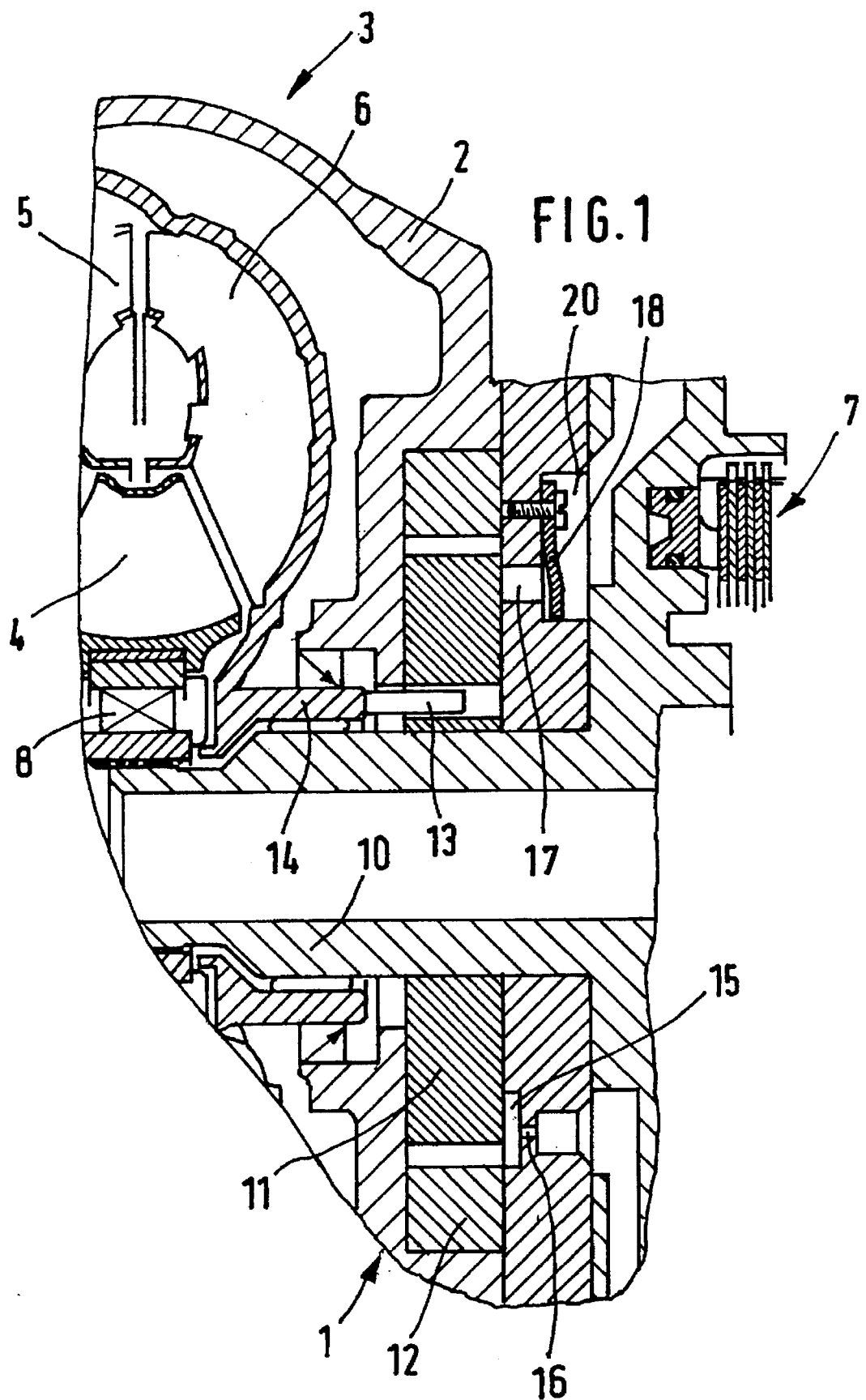
FIG. 1 depicts in a partial profile a transmission according to the invention with the positive-displacement pump being an internally-geared wheel pump.

An internally-geared wheel pump 1 is arranged in a transmission housing 2. Transmission housing 2 also contains a start-up device in the form of an hydrodynamic converter 3 with a guide wheel 4, a turbine wheel 5, and a pump wheel 6.

Internally-geared wheel pump 1 directly adjoins converter 3. On the other side of internally-geared wheel pump 1 lies the gear of which only part of one control brake 7 is shown.

Guide wheel 4 is positioned via a free-wheel 8 on a guide wheel hollow shaft 10 that is fixed upon the housing. On guide wheel hollow shaft 10, there is positioned an externally geared internal wheel 11 that engages an internally geared hollow wheel 12. The design of internal wheel 11 and hollow wheel 12 is generally known, for example, from DE 03 05 657 C2. The internal wheel 11 is driven via a cog 13 that is connected with the axial projection of a pump shaft 14 which is connected with pump wheel 6 of hydrodynamic converter 3. Because pump wheel 6 turns at the same rpm as the motor, internal wheel 11 is also driven at the same rpm as the motor.

A suction pocket 15 of the internally-geared wheel pump 1 is connected via a choke point 16 with a container of pressure medium (not shown). In the area of the pressure zone of the internally-geared wheel pump 1, there are several outlet boreholes 17 that are connected via check valves 18 with a collecting duct 20. The design of the check valves 18 is also known from DE 30 05 657 C2 and will therefore not be described in any greater detail. From collecting duct 20, the pressure medium is supplied to a lubricating device (not shown), and to a control and activation device of the transmission, for example, control brake 7.

In the practical example according to FIG. 2, the internally-geared wheel pump 1 is replaced by a radial piston pump 21 having a pump axis 41. The other parts correspond to the practical example according to FIG. 1. On the guide wheel hollow shaft 10, there is positioned an eccentric slide bush 22 that is driven by a cog 13. To reduce friction, it is practical to arrange a slide bush 23 and a slide ring 24 between the eccentric slide bush 22 and pistons 25. Pistons 25 are made as deep-drawn parts and are retained so as to rest against slide ring 24 by the force of pressure springs 26 with their piston bottom 27 that lies radially inside. Pistons 25 are preferably arranged at irregular angles relative to one another. Pistons 25 slide in cylinder boreholes 28 of a pump housing 29. Cylinder boreholes 28 are closed off by plugs 30. Each plug 30 is provided with a borehole 31 and at its front surface has two parallel grooves 32 that run along the circumferential direction of the radial piston pump and end within a worked sealing surface 33 of the front surface. Each plug 30, form a check valve since all plugs 30 are biased by an associated flat spiral spring 34.

Flat spiral spring 34 seals boreholes 31 and grooves 32 against a junction ring groove 35 that lies radially outside plugs 30. Junction ring groove 35 at the same time serves as a discharge compartment that is arranged directly on the check valves 18. When radial piston pump 21 is in a feeding mode, flat spiral spring 34 is lifted off sealing surface 33 on those plugs 30—that lie in the pressure zone of the radial piston pump 21 as a result of the pressure on borehole 31 and in grooves 32.

In the area of the radially outwardly pointed piston rim 36 of pistons 25, there is arranged in pump housing 29, coaxially with respect to the pump axis, an intake ring groove 37 that cuts the cylinder boreholes 28. Intake openings 38 are formed as a result of the cutting between intake ring groove 37 and cylinder boreholes 28. A suction throttle is formed between piston rim 36 and the particular intake opening 38 on each piston 25.

We claim:

1. A transmission suitable for use as an automatic or continuously variable transmission for motor vehicles which comprises a positive-displacement pump which supplies one or more of a lubricating device, control devices and activation devices of the transmission and wherein the positive-displacement pump is a suction-restricted radial piston pump having a suction throttle and an eccentric and said pump is driven by the rotation of a drive motor including an hydrodynamic converter having a pump wheel which is connected to the eccentric of the radial piston pump to thereby drive said pump.

2. A transmission according to claim 1 wherein the eccentric is formed as an eccentric slide bush positioned on a guide wheel hollow shaft and which is driven via interaction with an axially directed projection on a pump shaft of the pump wheel of the hydrodynamic converter.

3. A transmission according to claim 8 wherein the radial piston pump includes a pump housing, a pump axis, intake openings, and pistons which are deep-drawn, have a bottom and have a piston rim located opposite the bottom of the piston and wherein said piston rim is disposed radially outwardly in the pump, and wherein the intake openings are formed by a cut between cylinder boreholes and an intake ring groove arranged with its axis parallel with respect to a pump axis in a pump housing, the intake ring groove is separated from an eccentric space associated with the eccentric, and the piston rim, taken together with the intake openings, form a suction throttle.

4. A transmission according to claim 3 wherein each cylinder borehole of the radial piston pump is closed off in the radially outward direction by plugs, wherein each plug is provided with a borehole and has parallel grooves located on a surface thereof, which grooves run in a circumferential direction relative to a radial piston pump and end within a worked sealing surface of said surface of the plug, and wherein each plug is biased by a flat spiral spring to form check valves.

* * * * *